United States Patent [19]

Klumpjan

[11] Patent Number: 5,190,351
[45] Date of Patent: Mar. 2, 1993

[54] WHEELBARROW FOR TRANSPORTING ROCKS AND STONES

[76] Inventor: Joe Klumpjan, 1334 Sunset Dr. Rte. 3, Campbellsport, Wis. 53010

[21] Appl. No.: 825,881

[22] Filed: Jan. 27, 1992

[51] Int. Cl.[5] ............................................. B62B 1/24
[52] U.S. Cl. ..................................... 298/3; 280/47.31
[58] Field of Search ............... 280/47.31, 47.33, 47.23; 298/2, 3

[56] References Cited

U.S. PATENT DOCUMENTS

| | | | |
|---|---|---|---|
| 48,101 | 6/1865 | Sanford | 298/3 |
| 480,670 | 8/1892 | Radley et al. | 298/2 |
| 642,569 | 2/1900 | Baklund | 280/47.31 |
| 817,677 | 4/1906 | Smith | 280/47.23 |
| 845,207 | 2/1907 | Tripp | 280/47.3 |
| 868,462 | 10/1907 | Lorenzi | 280/47.23 |
| 1,232,387 | 7/1917 | Parker | 298/3 |
| 1,305,106 | 5/1919 | Hofer | 280/47.23 |
| 1,479,223 | 1/1924 | Carroll | 280/47.33 |
| 1,544,769 | 7/1925 | Nalder | 298/3 |
| 1,754,835 | 4/1930 | Newton | 298/2 |
| 2,234,879 | 3/1941 | Shoesmith | 298/3 |
| 2,608,360 | 8/1952 | Cootware | 280/47.3 |
| 2,852,304 | 9/1958 | Harrison | 298/3 |
| 2,889,152 | 6/1959 | Hurst et al. | 280/47.31 |
| 3,092,418 | 6/1963 | Themascus | 298/3 |

FOREIGN PATENT DOCUMENTS

| | | | |
|---|---|---|---|
| 537556 | 5/1955 | Belgium | 298/2 |
| 436020 | 10/1935 | United Kingdom | 298/3 |

*Primary Examiner*—David M. Mitchell
*Attorney, Agent, or Firm*—Andrus, Sceales, Starke & Sawall

[57] ABSTRACT

A wheelbarrow has an enlarged wheel and a low center of gravity for transporting heavy loads. The enlarged wheel and low center of gravity increases the stability of the wheelbarrow. The wheelbarrow includes a payload bucket which is tiltable for dumping the payload. The bucket is mounted such that the dumping operation is behind the wheel of the wheelbarrow, whereby the dumping operation can be completed without substantially altering the center of gravity of the wheelbarrow, further enhancing the stability of the wheelbarrow when transporting heavy loads. The wheelbarrow bucket includes an arcuate or C-shaped bottom facilitating the dumping operation.

3 Claims, 1 Drawing Sheet

WHEELBARROW FOR TRANSPORTING ROCKS AND STONES

BACKGROUND OF THE INVENTION

1. Field of the Invention

This invention is generally related to wheelbarrows and is specifically directed to a wheelbarrow for transporting rocks and stones.

2. Description of the Prior Art

Wheelbarrows are well known. However, the wheelbarrows of the prior art are generally designed for general purpose use such as, by way of example, the wheelbarrow disclosed in U.S. Pat. No. 868,462 issued to L. Lorenzi on Oct. 15, 1907. There have also been a number of wheelbarrows designed for specific use such as the wheelbarrow of U.S. Pat. No. 642,569 issued to G. Baklund on Feb. 6, 1900. The Baklund wheelbarrow is specifically designed to carry milk cans and the like.

U.S. Pat. No. 1,479,223 issued to G. Carroll on Jan. 1, 1924 also discloses a wheelbarrow specifically designed for carrying cans but adaptable for general purpose use as well.

U.S. Pat. No. 845,207 issued to C. Tripp on Feb. 26, 1907 discloses a wheelbarrow adapted for carrying unusually large and heavy objects wherein the object such as a barrel is self-leveling and the wheelbarrow has an enlarged wheel to provide better stability.

U.S. Pat. No. 1,754,835 issued to H. B. Newton on Apr. 15, 1930 also discloses a large wheeled wheelbarrow for better distribution of weight when hauling heavy objects.

It is also known to provide dumping wheel barrows as shown, for example, in U.S. Pat. Nos. 1,544,769 issued to G. Nalder on Jul. 7, 1925; 2,234,879 issued to H. Shoesmith on Mar. 11, 1941; 2,852,304 issued to L. E. Harrison on Sep. 16, 1958; and 3,092,418 issued to J. Themascus on Jun. 4, 1963. One of the problems with each of the dumping wheelbarrows of the prior art is the weight is generally distributed above and in substantial vertical alignment with the axis of the wheel, making the wheelbarrow unstable when carrying heavy loads.

U.S. Pat. No. 1,232,387 issued to I. Parker on Jul. 3, 1917 discloses a self-leveling wheelbarrow having a pivotable bucket. However, there is not sufficient clearance between the wheelbarrow and the wheel or other frame members to provide for dumping.

None of the wheelbarrows of the prior art are specifically directed to a transportation device for picking and hauling small stones and rocks from fields which are to be tilled for growing crops. In many regions of the country such as, by way of example, northern New England and Wisconsin and other areas where prehistoric glacier movements deposited large amounts of rubble just beneath the surface and the top soil, small rocks and stones surface with each spring thaw. This provides a continuing problem when preparing fields for planting at the beginning of each growing season. Typically, the rocks and stones must be physically and manually removed from the field before tilling in order to minimize damage to plow shares and the like. Even with the development of modern mechanized equipment for preparing fields, rock and stone removal still remains a substantially manual operation. Often this is accomplished by manually taking a wheelbarrow and a rock fork to the field and physically placing the rocks and stones in the wheelbarrow for transportation to a dump site. However, heretofore there have been no wheelbarrows specifically designed for this purpose. The wheelbarrows are either unstable under heavy load, difficult to manipulate, or are not well designed for the heavy loads and weight distribution generated during the rock picking activity. This requires that the wheelbarrow be used to carry lighter loads, increasing the number of trips and the amount of labor and time required to complete the task.

SUMMARY OF THE INVENTION

The subject invention is specifically directed to a wheelbarrow for picking and removing rocks from tillable fields. The wheelbarrow has a substantially oversized wheel supported on a sturdy frame. The payload bucket is supported on a plane substantially horizontal to the axis of the wheel and is adapted to be pivoted or tilted behind the wheel for dumping the rocks without disturbing the stability of the wheelbarrow. In the preferred embodiment of the invention, the bucket may be removed from the frame by lifting it out of the support channels. The handle for tilting the bucket also serves as the primary support member for supporting the bucket in a normally open, upright position during use. The axle, pivot bucket supports and handles are on a common line, minimizing back strain when lifting large loads.

The wheelbarrow has been found to be particularly well suited for removing rocks and stones from tillable fields. The enlarged wheel provides easy manipulation of the wheelbarrow and increases stability. The low center of gravity of the load increases stability and maneuverability of the wheelbarrow for this task. The low, in-line handles permit easy handling of substantially heavy loads with a minimum of back strain.

It is, therefore, an object and feature of the subject invention to provide for a wheelbarrow which is specifically designed for removing rocks and stones from tillable fields.

It is also an object and feature of the subject invention to provide for a wheelbarrow with a low center of gravity to provide stability in handling heavy loads.

It is a further object and feature of the subject invention to provide for a tiltable wheelbarrow wherein the payload is supported below the axle of the wheel, increasing stability of the wheelbarrow when transporting a heavy payload.

Other objects and features of the invention will be readily apparent from the accompanying drawings and detailed description of the preferred embodiment.

DETAILED DESCRIPTION OF THE PREFERED EMBODIMENT

Figure 1:
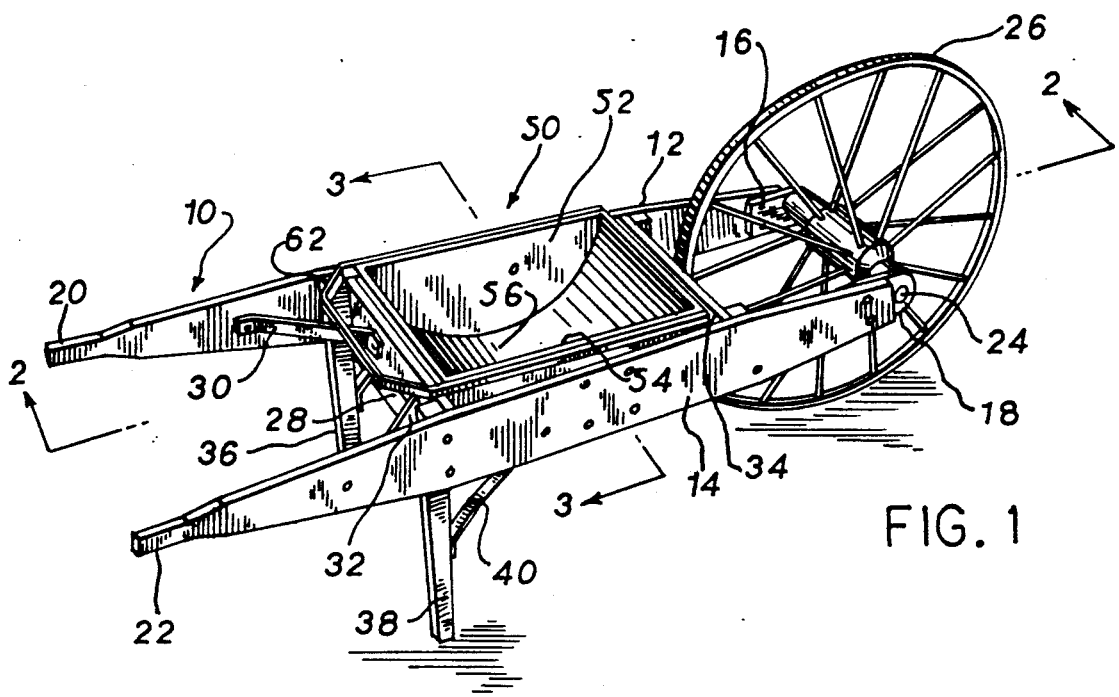
FIG. 1 is a perspective view of a wheelbarrow made in accordance with the subject invention.

The wheelbarrow of the subject invention is shown in FIG. 1 and includes a rigid frame 10 made of wood, steel, or other suitable material. In the preferred embodiment, the frame 10 includes two enlongated side rails 12 and 14 having an axis support such as the brackets 16, 18 at one end of the respective side rails 12, 14 and terminating in handles 20, 22 at the opposite end of respective side rails 12, 14. An axle 24 is supported between the brackets 16 and 18 for rotatably supporting the hubbed wheel 26. A cross brace 28 secures the side rails 12 and 14 in spaced apart relationship. In the preferred embodiment, a pair of angle brackets 30 and 32 are provided and are suitably secured to the respective side rails 12 and 14 and to the cross brace 28 to increase rigidity of the construction. Also, a second cross brace 34 may be provided just behind the wheel 26 to further increase rigidity of the assembly. In the preferred embodiment, the support legs 36 and 38 are mounted between the cross brace 28 and the respective side rails 12 and 14. An angle bracket 40 may be attached to each leg 36, 38 and to the respective side rail 12, 14 to further increase the rigidity of the assembly.

Figure 2:
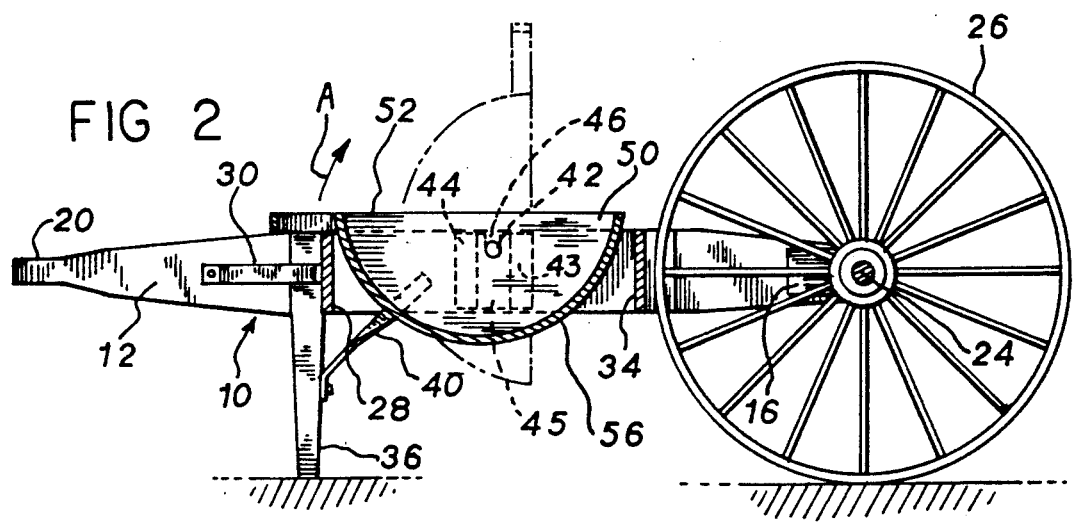
FIG. 2 is a section view of the wheelbarrow taken generally along the line 2—2 of FIG. 1.
Figure 3:
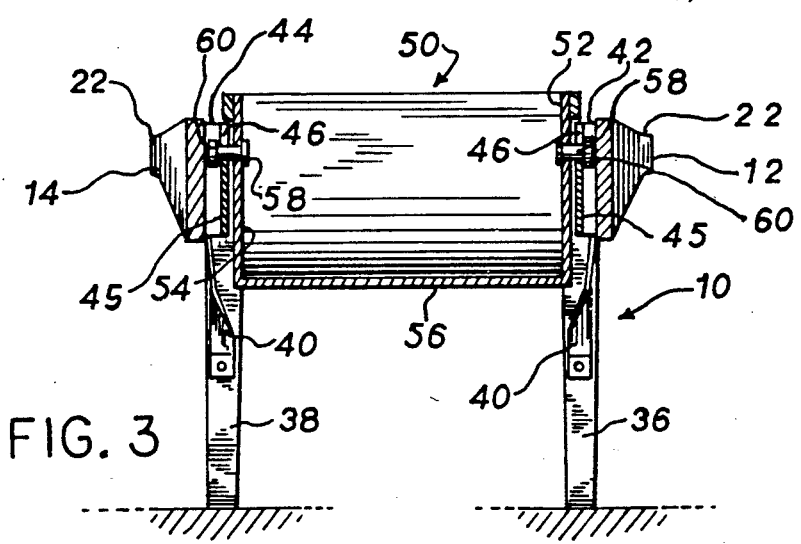
FIG. 3 is a section view of the wheelbarrow taken generally along the line 3—3 of FIG. 1.

In the preferred embodiment of the invention, a pair of support brackets 42 and 44 are secured, one each, to the respective side rails 12 and 14. As is best shown in FIG. 2, each support bracket includes a pair of outer base plates 43 and 44 which are secured directly to the respective side rail. The center panel of the bracket includes a raised or spaced plate 45 (see FIG. 3) which includes a U-shaped channel 46. The bucket 50 of the wheelbarrow includes a pair of outer side walls 52 and 54. In the preferred embodiment, the side walls have an arcuate lower edge and a continuous, rounded bottom wall 56 as suitably secured thereto to make an arcuate bucket. Each side wall 52, 54 of the bucket includes a projecting mounting post 58 projecting outwardly from the side wall and having a smooth cylindrical surface adapted to be received in the U-shaped channel 46 of the respective mounting bracket 42, 44 on the side rails 12, 14. Each mounting post 58 includes an enlarged outer head 60 to assure that the bucket does not inadvertently slip from the mounting brackets. A handle 62 is secured to the rear edge of the bucket 50 and extends toward the wheelbarrow handles 20 and 22. The handle 62 facilitates in dumping or tilting the bucket, as indicated by arrow A in FIG. 2 and also provides the stop or support member for supporting the bucket in its normal position, by resting on the cross brace 28.

In the preferred embodiment, the wheel 26 of the wheel barrow is approximately 30 inches in diameter, greatly increasing the stability of the wheelbarrow over the prior art, particularly when carrying substantially heavy loads such as rocks and stones. Also, as can be seen in FIG. 2, the bucket 50 can be moved to the dump position without substantially altering the center of gravity of the load, further increasing the stability of the wheel barrow during a stone picking and removal operation. In addition, where desired, the bucket may be removed from the frame of the wheelbarrow by simply lifting the bucket and sliding the posts 58 upwardly in the U-shaped channels on the mounting brackets 42, 44. The arcuate bottom 56 of the bucket greatly facilitates in a dumping operation by permitting the stones to roll or slide out of the bucket without substantially altering the center of gravity during the dumping operation.

The wheelbarrow of the present invention is ideally suited for carrying heavy payloads and is particularly well suited for removing rocks and stones from tillable fields. While specific objects and features of the subject invention have been disclosed in detail herein, it will be readily understood that the invention encompasses all modifications and enhancements within the scope and spirit of the following claims.

I claim:

1. A wheelbarrow for transporting rocks and stones, comprising:
    a. a frame having two elongated, spaced side rails, each with opposite ends, one end of each rail defining a handle and the other end of each rail defining a forward axle support, and at least one cross brace spanning the spaced side rails and securing them in rigid assembly;
    b. an axle mounted in the axle supports;
    c. a wheel mounted on said axle for rotation relative to said frame, wherein the wheel is of a minimum diameter of 30 inches;
    d. a pair of mounting brackets, one each mounted on each side rail intermediately of the opposite ends;
    e. a box having a semicylindrical closed bottom, upstanding side walls having a C-shaped bottom edge and an open top, said box including a pair of axially aligned pivot posts extending from said side walls forwardly of the axis of said semicylindrical bottom to position the center of gravity of said box rearwardly of the axis of said pivot posts, each post adapted to be removably received in one of said brackets for tiltably supporting the box relative to said frame, whereby the box is movable between an upwardly opening filling position with the forward edge of the open top positioned rearwardly of the wheel and a dump position in which the contents of the box are discharged to the rear of the wheel, and wherein said cross brace defines a support for holding the box in the filling position; and
    f. a support secured to and extending downwardly from said frame between the handles and the box for supporting the frame and the box above the ground.

2. The wheelbarrow of claim 1 further including a handle mounted on the continuous member adjacent one end and adapted for engaging the cross-brace when the box is in the normal position.

3. The wheelbarrow of claim 2, wherein the side rails are substantially parallel and the side walls of the box are substantially parallel to the side rails, each mounting bracket further including a substantially U-shaped channel with an open upper end and wherein each post is of cylindrical cross-section, whereby the post may be rotated relative to the base for moving the box from the normal position to the dump position.

* * * * *